United States Patent [19]

Murib et al.

[11] 3,991,121
[45] Nov. 9, 1976

[54] HALOBERYLLIUM HYDRIDE COMPLEXES

[75] Inventors: Jawad H. Murib; Stuart Schott; Charles A. Bonecutter, all of Cincinnati, Ohio

[73] Assignee: National Distillers and Chemical Corporation, New York, N.Y.

[22] Filed: May 13, 1974

[21] Appl. No.: 469,183

Related U.S. Application Data

[60] Division of Ser. No. 763,969, Sept. 30, 1968, Pat. No. 3,786,128, which is a continuation-in-part of Ser. No. 316,532, Oct. 16, 1963, abandoned.

[52] U.S. Cl............................................ 260/614 R
[51] Int. Cl.$^2$................... C07C 43/04; C07C 43/06
[58] Field of Search ................................ 260/614 R

[56] References Cited

UNITED STATES PATENTS

| | | | |
|---|---|---|---|
| 3,483,219 | 12/1969 | Shepherd | 260/326.8 |
| 3,555,020 | 1/1971 | Shepherd | 260/583 R |
| 3,786,128 | 1/1974 | Murib et al. | 260/614 R |
| 3,822,320 | 7/1974 | Lamoria | 260/614 R |

*Primary Examiner*—D. Horwitz
*Attorney, Agent, or Firm*—Kenneth D. Tremain

[57] ABSTRACT

A Lewis base complex of a haloberyllium hydride is prepared by reacting a hydride of an alkali metal or alkaline earth metal with a solution of beryllium halide in the presence of a Lewis base.

10 Claims, No Drawings

HALOBERYLLIUM HYDRIDE COMPLEXES

This is a divisional application of Ser. No. 763,969, filed Sept. 30, 1968, now U.S. Pat. No. 3,786,128, which was a continuation-in-part of application No. 316,532, filed Oct. 16, 1963 and now abandoned.

Beryllium hydride is of considerable importance in powder metallurgy and in space and military applications as a high energy fuel component. Its insolubility in inert solvents, however, greatly hinders its being purified to the level required for its use. Previous attempts to obtain high purity beryllium hydride have not been successful. For example, impurities remained in the beryllium hydride obtained by the pyrolysis of di-t-butyl beryllium (prepared from Grignard reagent) at about 200° C. (G. E. Coates and F. Clockling, J. Chem. Soc., 1526 (1954), according to the equation

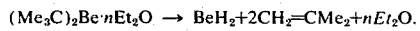

The removal of the impurities in the beryllium hydride obtained by the above method is difficult because of the insolubility of beryllium hydride in inert solvents.

It has now been found that high purity beryllium hydride can be prepared from a soluble form of a haloberyllium hydride, that is, from a Lewis base complex of haloberyllium hydride that has been formed by reacting a hydride of an alkali metal or an alkaline earth metal with a solution of a beryllium halide in the presence of a Lewis base.

In general a metal hydride or a complexed metal hydride, suspended or dissolved in an inert medium, is added to a stoichiometric equivalent of a beryllium halide in an inert solvent along with a Lewis base, the amount of the Lewis base being at least equimolar to the amount of the beryllium halide. The resulting mixture is agitated until the formation of insoluble by-product alkali metal halide or alkaline earth metal halide is essentially complete. The solution of the product haloberyllium hydride complex is then separated from the insoluble by-product halide by any convenient means.

The solution of the haloberyllium hydride can then be heated with distillation of the Lewis base, whereupon solid beryllium hydride, substantially free of impurities, is precipitated.

The preparation of haloberyllium hydride from a beryllium halide and an alkali metal hydride or an alkaline earth metal hydride is carried out, in accordance with the present invention, in the presence of a Lewis base at temperatures below 100° C. and in a closed system as illustrated by the following equation:

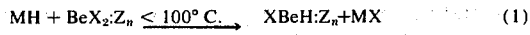

wherein M is an alkali metal or an alkaline earth metal; X is a halogen selected from the group consisting of chlorine, bromine and iodine; Z is a Lewis base; and n ranges between 0.5 and 2.

After completion of the reaction, the soluble haloberyllium hydride can be readily separated from the insoluble metal species (i.e., by-product MX and residual MH) by filtration thereby obtaining soluble $XBeH:Z_n$, free of alkali or alkaline earth metal ions. The product can then be disproportionated in a second step in the absence of metal ions to give solid $BeH_2$ and soluble $BeX_2$ according to the following equilibrium reaction:

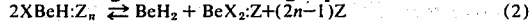

wherein X, Z and n are as defined above in connection with Eq. 1.

The reaction in Eq. 2 can be shifted to the right direction by employing any method that facilitates removal of the Lewis base from the system. For example, distillation of the Lewis base at any temperature between about 25° to 175° C. leads to formation of solid beryllium hydride. Vacuum distillation of the Lewis base from the reaction mixture permits operation at low temperatures, for example, between 50° and 100° C. However, when the reaction (Eq. 2) is carried out in a closed system, i.e., without distillation of the Lewis base, high temperatures, i.e. above 100° C., are required to effect the disproportionation. It is preferred, however, to operate the disproportionation reaction (Eq. 2) at below 100° C. under vacuum in order to minimize incorporation of insoluble by-products in the final beryllium product. Thus, in the case of using diethyl ether as the Lewis base, the undesirable by-products include insoluble species derived from ether cleavage such as $XBeOC_2H_5$ and $HBeOC_2H_5$. Although these compounds are soluble in aromatic hydrocarbons, the occluded impurities could not be removed by extraction with these solvents. Therefore, it is preferred to employ temperatures at which cleavage of ether does not occur. In the case where the product $XBeH:OEt_2$ is prepared in aromatic hydrocarbons at relatively high temperatures, e.g. 100° C., any by-product of ether cleavage can be separated by stripping off the aromatic solvent and subsequent dissolution of the product in ether followed by filtration of the insoluble impurities and finally by distilling off the excess ether thereby obtaining pure haloberyllium hydride-etherate.

The beryllium halide suitable for the practice of this invention can be beryllium chloride, beryllium bromide, or beryllium iodide. It is possible to use instead of the halide other salts such as the alkoxides, e.g., beryllium methoxide or beryllium isopropoxide; the mercaptides, e.g., beryllium ethyl mercaptide or beryllium isobutyl mercaptide; and the like. When these beryllium salts are used it is preferred to use aromatic hydrocarbons as media for the reaction of Equation 1.

The metal hydride can be any simple alkali metal hydride, alkaline earth metal hydride, or mixture thereof, e.g., LiH, NaH, KH, CsH, $MgH_2$, and $CaH_2$, or complex metal hydride having the formula $M(HM'R_3)_n$ or $M(HM'(OR')_3)_n$, wherein M is an alkali metal or alkaline earth metal, M' is boron or aluminum, R is hydrogen, an alkyl radical having from 1 to about 5 carbon atoms or an aryl radical having from 6 to about 9 carbon atoms, R' is an alkyl radical having from 1 to about 5 carbon atoms or an aryl radical having from 6 to about 9 carbon atoms, and n is one or two.

The Lewis base is an electron pair donor that does not contain an acidic hydrogen and can be selected from groups of dialkyl ethers such as dimethyl ether, diethyl ether, methylethyl ether, dipropyl ether, dibutyl ether, β, β '-dichloroethyl ether diaryl ethers such as diphenyl ether, tolyl phenyl ether and ditolyl ether; alkyl aryl ethers such as anisole and ethyl phenyl ether; dialkyl sulfides such as dimethyl sulfide, diethyl sulfide, n-propyl sulfide, di-n-butyl sulfide and ethyl methyl sulfide; tertiary amines such as trialkylamines (trimethylamine, triethylamine and tri-n-propylamine), pyridines (2-ethyl pyridine and 2-n-propyl pyridine), piperidines (N-methyl piperidine, N-ethyl piperidine and N-propyl piperidine); and dialkyl aryl amines (dimethyl aniline, diethyl aniline and ethyl methyl aniline). In instances where it is desired to carry out the disproportionation reaction in conjunction with the preparation of the haloberyllium hydride, the use of one of the weaker Lewis bases, e.g., diethyl ether, methylphenyl ether, and dimethyl sulfide, is preferred so that the beryllium hydride obtained in the disproportionation reaction (Eq. 2) does not complex with the Lewis base present.

The selected solvent should be a solvent both for the beryllium halide reactant and the haloberyllium hydride product and must be chemically inert to both the reactant and the product. It should also be relatively volatile to permit easy removal from the product. Suitable media include saturated aliphatic hydrocarbons and aromatic hydrocarbons, such as kerosene, hexane, nonane, isooctane, benzene, toluene, xylene, and mesitylene; inert chlorinated hydrocarbons, such as chlorobenzene, 2,4-dichlorotoluene, o- and p-chlorotoluene, o-chlorobenzene, p-dichlorobenzene, and o-xylyl chloride; and halogenated acyclic hydrocarbons, such as trichloroethylene and methylene dichloride; and the like; and mixtures of these.

It is also possible to have one of the Lewis bases listed above serve as part or all of the solvent in the haloberyllium hydride formation reaction (Eq. 1), in which case an amount of Lewis base in excess of that required to complex the beryllium halide is employed.

In carrying out the disproportionation reaction it is preferred that the reaction medium have a higher boiling point than any Lewis base present in order to be able to selectively remove the Lewis base by distillation.

Any solvent and Lewis base used in the process of the present invention must be free from moisture and peroxides. The beryllium halides should be anhydrous in order to avoid hydrolysis of the active hydride which would result in poor yields and conversions as well as low reaction rates.

The preferred molar ratio of metal hydride (M-H bonds) to the beryllium content in the reaction mixture is 1:1. At higher ratios of metal hydride, the intermediate HBeX tends to react with the excess metal hydride to prematurely form beryllium hydride (BeH$_2$) which would be difficult to separate from the insoluble metal halide being formed. Lower ratios of metal hydride lead to incomplete conversion of the beryllium halide and make the subsequent disproportionation reaction more difficult.

The amount of Lewis base used is at least equimolar to the amount of beryllium halide. Preferably, 2 or more moles of Lewis base per mole of beryllium halide are used.

The solvent should be used in a quantity sufficient to maintain in solution both the reactant beryllium haide-Lewis base complex and the product haloberyllium hydride-Lewis base complex.

The reaction in which the haloberyllium compound is formed is generally carried out at a temperature at which its disproportionation is minimal, that is, in the range of about 0° l to 100° C. and preferably in the range of about 25° to 85° C. The accompanying pressure need only be sufficient to maintain the solvent in liquid phase, and is preferably, but not necessarily, that which permits the removal of the Lewis base by distillation.

By the process of this invention beryllium hydride of high purity can be obtained, the solubility of haloberyllium hydrides in certain organic solvents offering an intermediate to BeH$_2$ by disproportionation to the insoluble solid BeH$_2$ and the soluble beryllium dihalide-Lewis base complex. The solubility of the latter in many inert organic solvents permits its being used in a cyclic process.

The process of this invention also provides a means for the purification of beryllium hydride prepared by conventional methods. The crude beryllium hydride is reacted with a beryllium chloride, beryllium bromide, or beryllium iodide in the presence of an inert solvent and a Lewis base at a temperature within the range of about 0° to 100° C. and preferably within the range of about 25° to 85° C. to form a soluble haloberyllium hydride in accordance with the following equation:

$$BeH_2 + BeX_2 + 4Z \rightleftarrows 2XBeH \cdot Z_2 \qquad (3)$$

where X and Z are the same as defined for Equations 1 and 2. The ratio of the amount of beryllium halide to the amount of the beryllium hydride should be at least 1:1. Higher ratios of the halide accelerate solubilization of the beryllium hydride, but tend to hinder its subsequent recovery via disproportionation of the haloberyllium hydride in accordance with the process of Equation 2. A ratio of beryllium chloride to beryllium hydride of 1:1 is preferred. At least 2 moles, and preferably 3 to 4 moles, of Lewis base are used per mole of beryllium halide. For example, treatment of polymeric solid BeH$_2$ with beryllium chloride and a Lewis base, e.g., diethyl ether, in a ratio of 1:1:4 in solution in an inert solvents, e.g., toluene at 70° C., yields the soluble addition compound BeH$_2$·BeCl$_2$ ⇌ 2ClBeH, i.e., chloroberyllium hydride. Solubilizing BeH$_2$ in this manner provides a novel means of purification, allowing the isolation of high purity beryllium hydride by disproportionation of the chloroberyllium hydride in accordance with the reaction and conditions of Equation 2.

In addition, novel haloberyllium hydride-Lewis base complexes have been prepared. As discussed above, such complexes are useful in the preparation of pure beryllium hydride, useful in powder metallurgy and in high energy propellant formulations. Moreover, chloroberyllium hydride is useful as a reducing agent. Also chloroberyllium hydride can be reacted with olefins to form the corresponding mixed chloroberyllium alkyls which can then be disproportionated to beryllium alkyls and beryllium chloride, thus offering a novel route to beryllium alkyls other than by means of Grignard reagents. Further, beryllium alkyls are intermediates in the conventional preparation of beryllium hydride.

While there are disclosed below but a limited number of embodiments of the invention herein presented, it is possible to produce still other embodiments without departing from the inventive concept herein disclosed. It is desired, therefore, that only such limitations be imposed on the appended claims as are stated therein.

Example I 1.95 Grams of freshly distilled beryllium chloride dissolved in 90 ml. of dry dimethyl sulfide was placed in a 250 ml. glass pressure bottle half-filled with stainless steel balls ⅛ inch in diameter. To this solution was added 0.61 g. of sodium hydride dispersed in 7.5 ml. of kerosene. The reaction mixture was ball-milled at ambient temperatures for 16 hours. The reaction mixture was then filtered and the clear filtrate analyzed. The filtrate contained 6.05 mmoles of soluble chloroberyllium hydride, ClBeH:2SMe$_2$, corresponding to a conversion of 24.9% based on the initial charge of beryllium chloride. Analysis by flame spectroscopy discloses absence of sodium in the filtrate showing that all the sodium was retained in the solid phase and that the soluble chloroberyllium hydride was free of sodium.

Example II

The procedure of Example I was repeated except that diethyl ether was used as the solvent instead of dimethyl sulfide. The reaction mixture consisted of 5.25 g. of beryllium chloride dissolved in 104.4 g. of diethyl ether and 1.71 g. of sodium hydride suspended in 6.8 g. of toluene. The mixture was ball-milled at room temperature for 3 days and filtered. Hydrolytic analysis of 29.13 g. sample of the clear filtrate gave the soluble atomic ratios of H:Be:Cl of 1.00:1.02:1.03 in contrast to theoretical values of 1:1:1 for HBeCl. H being an active hydrogen released as gaseous hydrogen on hydrolysis. Flame spectroscopy disclosed absence of sodium in the hydrolysate showing that the product was sodium-free chloroberyllium hydride.

Another sample (49.0 g.) of the filtrate was pumped in high vacuum at room temperature to remove the toluene and ether solvent. The residue was redissolved in 50 ml. of dry diethyl ether and filtered. A 19.2 g. sample of this ether solution was pumped overnight at 0° C. The non-volatile residue consisted of a colorless liquid which upon analysis gave an atom-mole ratio of beryllium to ether of 1.00:1.95, in good agreement with the theoretical value 1:2 for the dietherate, $ClBeH:2O(C_2H_5)_2$. A second sample (14.56 g.) of the ether solution was pumped at 0° C. to distill off the excess ether. The liquid residue was then pumped in high vacuum ($10^{-4}$ mm. Hg) at room temperature for 4 hours. The non-volatile residue was colorless liquid which exhibited an atom-mole ratio of beryllium to ether of 1.00:0.96 in contrast to the theoretical ratio 1:1 for the monoetherate, $ClBeH:O(C_2H_5)_2$. Continued pumping at 30° C. for additional 12 hours resulted in the loss of more ether, leaving a solid residue with a beryllium to ether ratio of 1.00 to 0.52.

A. When Example II was repeated, using trimethylamine instead of diethyl ether, the product was soluble chloroberyllium hydridetrimethylaminate.

B. When Example II is repeated using $BeBr_2$ instead of $BeCl_2$, soluble bromoberyllium hydride-diethyl etherate is obtained.

C. When Example II is repeated using $BeI_2$ instead of $BeCl_2$ the product is soluble iodoberyllium hydride-diethyl etherate.

Example III

The procedure of Example I was repeated except that a mixed solvent was used consisting of 80% by volume of anisole, 15 percent of diethyl ether, and 5% of kerosene. Soluble chloroberyllium hydride was obtained, demonstrating the use of alkyl-aryl ethers as solvents.

Example IV

The procedure of Example II was repeated except that lithium hydride was reacted with beryllium chloride, giving an ether-soluble chloroberyllium hydride.

Example V

A mixture consisting of 114.8 g. of beryllium chloride, 198.8 g. of diethyl ether, 36.8 g. of sodium hydride and 735.2 g. of benzene was heated in a stirred pressure reactor at 90° C. for 11 hours. The reaction mixture was cooled to room temperature and filtered. A 1.41 g. sample of the filtrate was analyzed. The soluble ratios of H:Be:Cl were 0.955:1.00:1.09 compared to the theory 1:1:1 for HBeCl.

Example VI

A mixture of 8.2 g. of beryllium chloride, 150 ml. of diethyl ether, 5.0 g. sodium hydride and 25 g. of kerosene was charged to a 300 ml. pressure reactor. The reaction mixture was stirred and heated at 130° C. for 24 hours. After cooling to room temperature the mixture was filtered and the filtrate analyzed. The filtrate contained a trace amount of beryllium chloride but no soluble hydride, indicating that under these reaction conditions essentially all the beryllium content was retained in the solid phase as $BeH_2$ in admixture with by-product NaCl and residual NaH. Isolation of beryllium hydride from the solid phase was not possible because $BeH_2$, NaCl and NaH are all insoluble in diethyl ether.

While this invention has been disclosed and illustrated by the above examples, it will be understood that the invention is obviously subject to other modifications and variations without departing from its broader aspects.

What is claimed is:

1. A haloberyllium hydride-Lewis base complex having the formula:

$$XBeH:Z_n$$

wherein X is a halogen selected from the group consisting of chlorine, bromine and iodine, Z is a Lewis base which does not contain a protonic hydrogen, and is a dialkyl ether, and n ranges between 0.5 and 2.0.

2. A complex as defined in claim 1 wherein Z is a dialkyl ether.

3. A complex as defined in claim 1 wherein Z is diethyl ether.

4. The complex of claim 3 wherein X is chlorine.

5. A process for producing a complex as defined in claim 1 which comprises reacting in a closed system (a) an alkali metal hydride or alkaline earth metal hydride with (b) a beryllium halide at a temperature in range of 0° to 100° C. in the presence of said Lewis base which is free of protonic hydrogen.

6. The process of claim 5 wherein the amount of Lewis base is at least equivalent to the amount of beryllium halide.

7. The process of claim 5 wherein (a) is sodium hydride, (b) is beryllium chloride and the Lewis base is diethyl ether.

8. The process of claim 5 wherein the reaction of (a) and (b) is carried out in the presence of an aromatic hydrocarbon solvent in addition to the Lewis base and subsequently stripping of the aromatic hydrocarbon solvent, dissolving the remaining product in an additional amount of Lewis base, filtering out any insoluble impurities formed and thereafter distilling off the excess Lewis base thereby obtaining pure haloberyllium hydride-Lewis base complex.

9. The complex of claim 1 wherein said ether is selected from the group consisting of dimethyl ether, diethyl ether, methylethyl ether, dipropyl ether, dibutyl ether, and $\beta, \beta$-dichloroethyl ether.

10. The process of claim 5 wherein said Lewis base is selected from the group consisting of dimethyl ether, diethyl ether, methylethyl ether, dipropyl ether, dibutyl ether, and $\beta, \beta'$-dichloroethyl ether.

* * * * *